Sept. 24, 1940.   G. B. ELLIS   2,215,782
TELEPHONIC UNIT
Filed Aug. 31, 1938   3 Sheets-Sheet 1

INVENTOR
Grenville B. Ellis
BY
Ramsey, Kent, Chisholm & Lutz
his ATTORNEYS

Sept. 24, 1940.   G. B. ELLIS   2,215,782
TELEPHONIC UNIT
Filed Aug. 31, 1938   3 Sheets-Sheet 2

INVENTOR
Grenville B. Ellis

Sept. 24, 1940.  G. B. ELLIS  2,215,782
TELEPHONIC UNIT
Filed Aug. 31, 1938  3 Sheets-Sheet 3

INVENTOR
Grenville B. Ellis
BY
Ramsey, Kent, Chisholm & Lutz
his ATTORNEYS

Patented Sept. 24, 1940

2,215,782

UNITED STATES PATENT OFFICE 2,215,782

TELEPHONIC UNIT

Grenville B. Ellis, Brooklyn, N. Y., assignor to Control Instrument Company, Inc., Brooklyn, N. Y., a corporation of New York Application August 31, 1938, Serial No. 227,660

13 Claims. (Cl. 179—119)

The present invention relates to the art of telephony and more especially to a telephonic unit adapted to act as a self-energizing telephonic unit.

The device, comprising an embodiment of the present invention, is adapted to be used either for transmitting or receiving sound. A pair of units in accordance with the present invention when connected in an electrical circuit comprises a complete telephonic system. The unit is also useful as a receiver in a power operated circuit with any well known type of transmitter, for example, the unit may be connected with a carbon transmitter on a line energized by batteries or other source of current, at which time the unit operates as a receiver. The device is especially designed, however, for military use wherein it is important that simplicity and rigidity of parts be considered in the construction and operation of the device, and to this end, the device is designed to operate efficiently in a simple electric circuit with a unit on each end of the circuit and without additional electrical apparatus.

More especially, the construction is such that accurate assembly is accomplished through the design of interfitting parts which automatically maintain desired constants when the device is assembled. The elimination of disturbing Foucault currents is attained and the parts of the device are so shaped and arranged as to avoid "blasting" under excessive sound conditions which frequently occur in the use of military telephones, either in the Navy or Army, where telephones are often installed in the proximity of big guns. The discharge of heavy pieces of ordnance sets up very violent sound waves and air waves which may destroy the effective operation of ordinary telephonic apparatus. The present invention comprises a construction which operates efficiently even in the proximity of large guns which are firing.

Other and further objects of the present invention will in part be obvious and will in part be pointed out hereinafter by reference to the accompanying drawings forming a part of this application and throughout which like characters are used to represent like parts.

Figure 1:
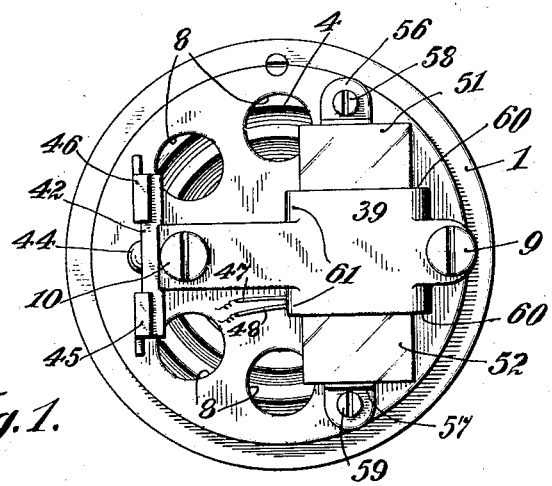
Fig. 1 is a plan view of the preferred embodiment of the present invention.
Figure 2:
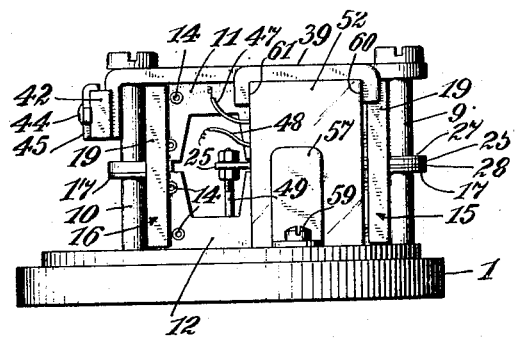
Fig. 2 is a side elevation of the device shown in Fig. 1.
Figure 3:
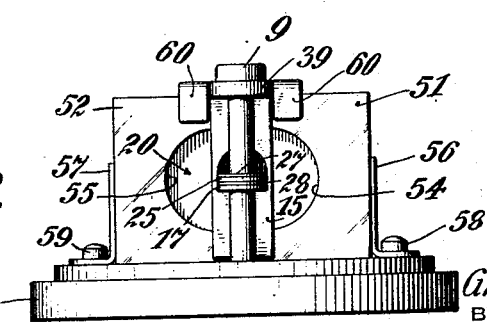
Fig. 3 is an end view looking at the right end of the device shown in Fig. 2.

Referring to the drawings, a preferred embodiment of the present invention comprises a circular base member 1 upon and within which the operating elements of the unit are mounted. A base 1 is provided with a recess 2 in which is mounted a diaphragm 4. This diaphragm is held in place by being seated upon a shoulder 5 in the base plate 1 and is clamped in position against the shoulder by means of a clamp ring 6 which bears against a non-rotatable ring 7 that rests on the edge of the diaphragm. The base plate 1 is provided with a plurality of openings 8 to obviate the formation of a dead air pocket back of the diaphragm.

Brass mounting screws 9 and 10 are screw threaded into tapped openings in the base member 1 and these mounting screws 9 and 10 comprise the setting members around which the assembly of the unit is based. A pair of pole pieces 11 and 12 are formed from stampings of soft non-corrosive sheet steel which are tightly riveted together by hollow brass rivets 14 to form laminated structures providing a suitable path for magnetic lines of force. Brass channel strips 15 and 16, identical in form, are provided with ears 17 which have openings therein through which the brass mounting screws 9 and 10 extend. The sides 18 and 19 of the brass channels 15 and 16 are adapted to embrace and hold the ends of the pole pieces 11 and 12. A voice coil 20 is assembled on the lower pole piece 12 by telescoping the notches 21 in the side walls of the coil spool 13 over the bar of the pole piece 12 so that the coil fits between the legs 22 and 24 of the pole piece 12. An armature 25 of hard "Armco" silicon sheet steel is extended through an opening 26 in the spool 13 of the coil 20 and a pair of brass shims 27 and 28 together with the fixed end of the armature are extended through an opening 29 in the channel strip 15. The width of the armature 25 and the brass shims 27 and 28 is such as to contact the sides 18 and 19 of the brass channel strip 15 and are also provided with openings through which the brass mounting screw 9 extends. This construction is such that when the parts are assembled, the shims clamp the fixed end of the armature tightly against movement in any direction and in correct relation to the pole pieces 11 and 12. The other brass mounting screw 10 extends through a brass spacer block 30 which is adjacent the ear 17 of the channel strip 16. This spacer block 30 has a thickness exactly equal to the combined thicknesses of the armature 25 and the brass shims 27 and 28, so that the co-planar pole faces 31, 32, and 34 of the pole piece 12 are all automatically spaced equal distances from the co-planar pole faces 35, 36, and 37 on the pole 11 when the pole piece 11 is assembled within the sides 18 and 19 of the channel strips 15 and 16 and over the notches 38 in the upper side of the spool 13 for the voice coil 20.

Figure 4:
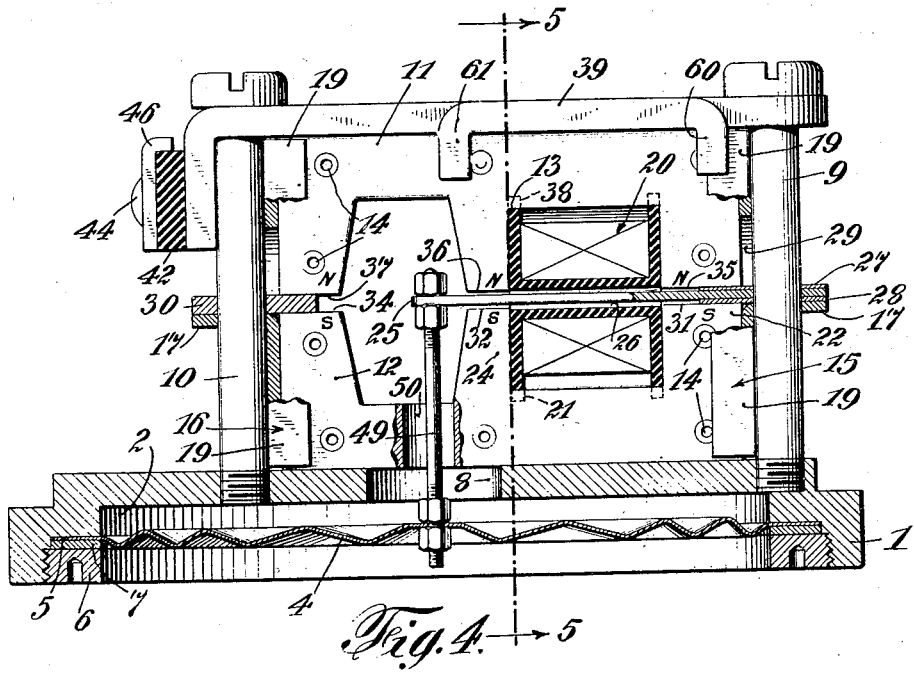
Fig. 4 is a side elevation similar to Fig. 1 with the permanent magnets removed and the energizing coil in section and with other portions of the construction in section.
Figure 5:
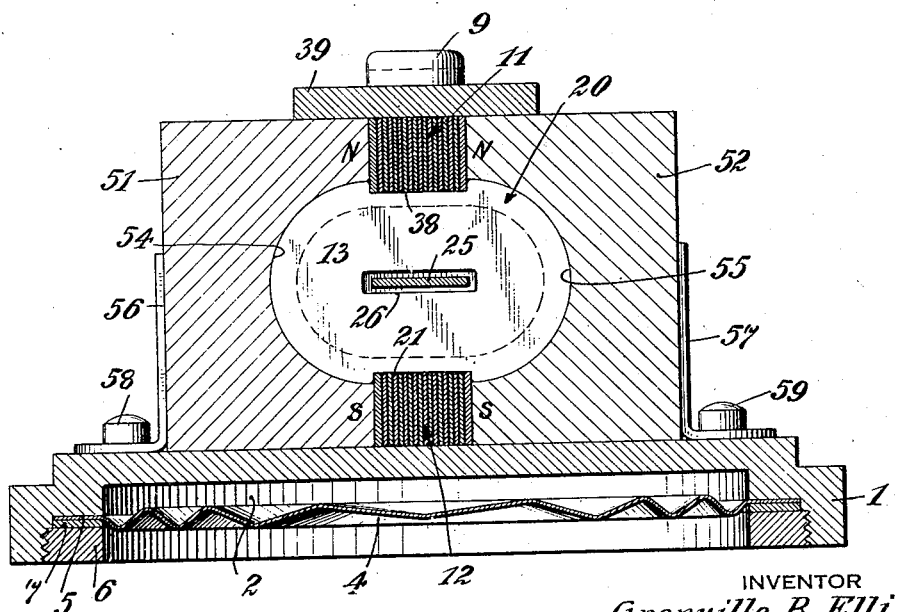
Fig. 5 is a sectional view taken on line 5—5 of Fig. 4 but showing the permanent magnets in place and in section.
Figure 6:
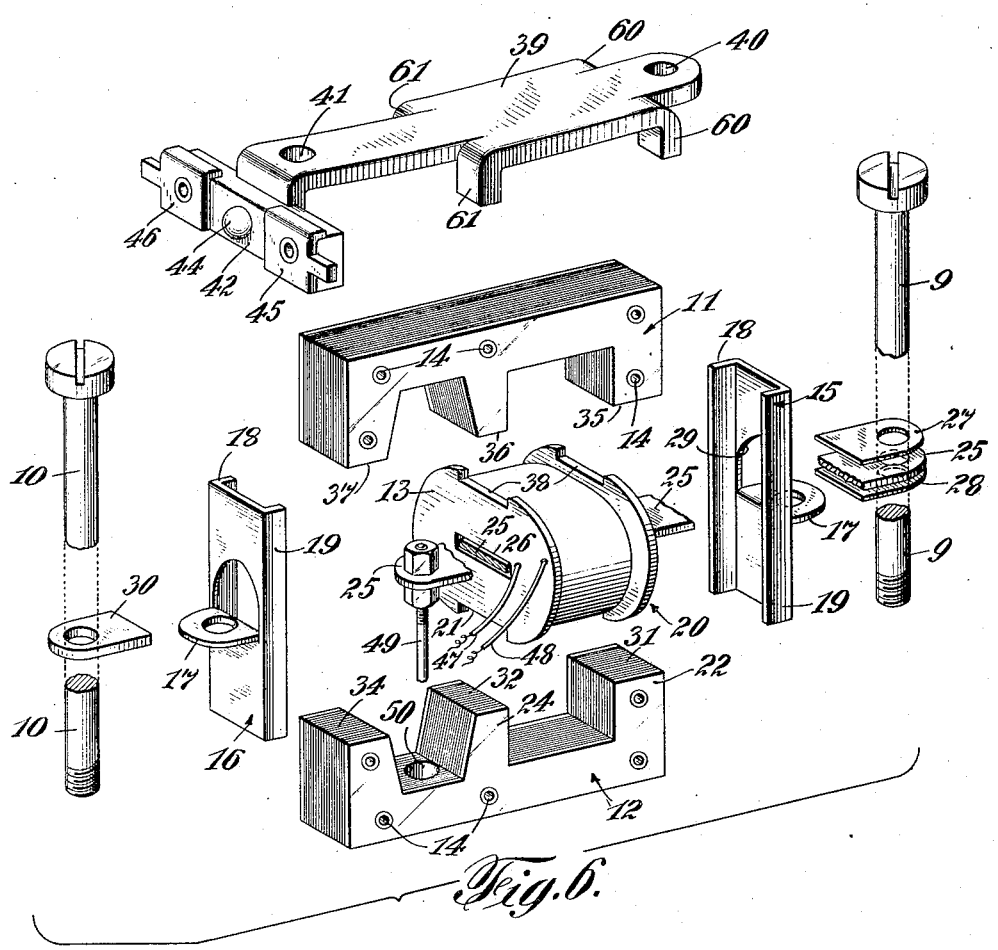
Fig. 6 is an exploded view of the coil, the armature, the pole pieces, and certain assembly parts.

A mild steel top plate 39 bears upon the top of the pole piece 11 and is provided with openings 40 and 41 through which the brass mounting screws 9 and 10 extend. This top plate is slightly bowed, with the convexity of the plate being upward, so that when the mounting screws 9 and 10 are screwed into the base member 1, the top plate 39 is straightened out and applies a downward force on the pole piece 11, the spacer block 30, the shims 27, 28, the fixed end of the armature 25, and on the pole piece 12. A terminal block 42 of insulating material is secured by a rivet 44 to the forward end of the top plate 39 and is provided on its ends with terminals 45 and 46 to which the ends 47 and 48 of the voice coil wire are respectively attached. A light weight stiff strut rod 49 adjustably connects the free end of the armature 25 with the diaphragm 4 and this rod 49 extends through an opening 50 provided through the pole piece 12 (Fig. 4), and one of the openings 8 in the base member 1.

From the foregoing, it will be observed that the construction and assembly of the unit comprising the present invention is of simplified design and the brass mounting screws 9 and 10 are the major frame work on which the assembly is predicated so that by passing these screws through the openings provided in the ears 17 of the channel strips, the shims, the spacing block, and the armature with the voice coil in place between the pole pieces, and the top plate in position, the parts are precisely, positively, and definitely assembled in correct relation. Thus after the parts are fabricated, the major assembly is accomplished by the setting of the two brass mounting screws 9 and 10 in the base member 1.

Permanent magnets 51 and 52 (Figs. 1, 2, 3, and 5) complete the assembly. These permanent magnets are made of high residual flux density metal comprising an aluminum, nickel, steel alloy known to the trade as "Al-Ni-Co" steel. These permanent magnets 51 and 52 are provided with openings 54 and 55 which enclose the voice coil 20, and the pole faces of the permanent magnets 51 and 52 are closely fitted against the sides of the pole pieces 11 and 12. The permanent magnets 51 and 52 are assembled with these pole pieces 11 and 12 in such manner that common magnetic poles are positioned on opposite sides of the respective pole pieces so that the entire pole piece 11 will have one magnetic pole characteristic, and the entire other pole piece 12 will have the opposite magnetic pole characteristic, in order that the magnetic flux tends to flow between the pole faces 31—35, 32—36, and 34—37, respectively. The permanent magnets 51 and 52 are held in position by spring brackets 56 and 57 that are mounted on the base member 1 by means of stub screws 58 and 59 in such manner that the upstanding arms of these brackets act as springs to push the permanent magnets toward each other and against the sides of the pole pieces 11 and 12. The permanent magnets 51 and 52 are further held in position by ears 60 and 61 that depend from the top plate 39 and extend downwardly on opposite sides of the permanent magnets 51 and 52.

Figure 7:
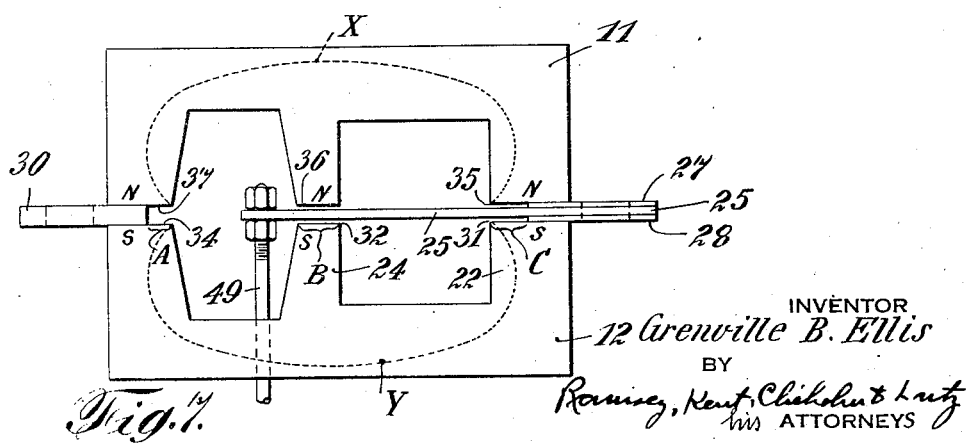
Fig. 7 is a diagrammatic view illustrating the path of the magnetic lines of force through certain of the pole pieces.

Referring now more especially to Fig. 7, which is more or less of a diagrammatic figure, it will be observed that the length of the shims 27 and 28 is less than the length of the pole faces 35—31, and that the brass spacer 30 extends between the pole faces 34—37 a distance which is less than the length of these pole faces. The area of the free air space between the pole faces 31—35 is indicated by the bracket C (Fig. 7) and the area of free air space between the pole faces 34 and 37 is indicated by the bracket A. The free air space area A combined with the free air space area C, equals the free air space area B between the pole faces 32—36.

When "blasting" occurs, the effect is produced in the receiving unit due to the fact that an overload or unusual heavy alternating current is effective in the system. When a gun of large caliber is fired in the proximity of a transmitting unit, the diaphragm flexes to an unusual extent and imposes its movement on the armature which sends out into the system, through the voice coil, an alternating current having peaks of unusual magnitude. When such a current is received in the receiving unit, in accordance with the present invention, the disturbance of the electrical field produced by the armature at the receiving unit tends to vary the flux in the pole pieces 11 and 12. This variable flux flows between the pole faces 31—35, 32—36 and 34—37. The total variable flux effective between the pole faces 32—36 is diminished by the shunt flux flowing between the pole faces 31—35 and 34—37. Therefore, the total variation as between the pole faces 32—36 is diminished for peak loads and consequently, the unit does not blast to the extent that would occur in a single pole construction utilizing the pole faces 32—36 alone.

It is also recognized in the electrical arts that where a varying magnetic flux passes through a metallic conductor, such as a piece of brass or a piece of copper, local currents are set up that are known as "Foucault" currents. The magnetic flux tends to take the shortest path, and, therefore, so far as the pole faces 31—35, and 34—37 are to be considered, the flux from the permanent magnets 51 and 52 will substantially follow the dotted lines X and Y, and will concentrate adjacent the inner corners of the pole faces 31—35, and 34—37. It is to be observed that there is no metal between these pole faces adjacent these inner corners and, therefore, the tendency to produce "Foucault" currents in the unit is substantially lessened. This also contributes to the effective operation of the unit.

The above features of the present invention produce a telephonic instrument which is particularly useful for military work, and the present instrument is being used, without a battery, in the circuits over distances of many miles to transmit conversation in a completely satisfactory, audible manner.

It is to be understood that the unit comprising the present invention is mounted in a suitable casing such as a handle which is provided with suitable means to direct sound waves to and from the diaphragm, as is well known in the art.

What I claim is:

1. In a telephonic unit, the combination of a base frame, a pair of mounting screws threaded into said base frame, a pair of channel members mounted upon and carried by said mounting screws, pole pieces extending between said channel members, said pole pieces each having three pole faces, spacing means between the end pole faces of said pole pieces, and clamping means cooperating with said mounting screws to clamp said pole pieces together whereby said spacing means determines the distance between all three of the pole faces of said pole pieces.

2. In a telephonic unit, the combination of a circular base frame of non-magnetizable material, a pair of non-magnetizable mounting screws threaded into said base frame, a pair of channel members of non-magnetizable material mounted upon and carried by said mounting screws, laminated multiple pole pieces extending between said channel members, spacing means of non-magnetizable material between both pairs of the end pole faces of said multiple pole pieces, and clamping means cooperating with said mounting screws to clamp said pole pieces together whereby said spacing means accurately determines the distance between the pole faces of said multiple pole pieces.

3. A telephonic unit comprising a base frame, assembly posts mounted on said base frame, channel members, means to secure said channel members to said assembly posts, pole pieces having three opposed faces each, said pole pieces being slidably mounted within said channel members, spacing means between the outer pole faces of said pole pieces, an armature comprising a part of the spacing means between one pair of pole piece faces, one pair of said opposed faces on said pole pieces being outside of the influence of said armature, and means cooperating with said assembly posts to clamp said pole pieces and the spacing means against the said base frame.

4. A telephonic unit comprising a circular base frame, assembly posts mounted on said base frame, channel members, means to slideably secure said channel members to said assembly posts, laminated pole pieces having three opposed pole faces each, said pole pieces being slideably mounted within said channel members, spacing means of non-magnetizable material between the outer pole faces of said pole pieces, an armature of magnetizable material comprising a part of the spacing means between one pair of pole piece faces, said armature extending between two pairs of said pole faces only, and means cooperating with said assembly posts to clamp said pole pieces and the spacing means against the said base frame.

5. A telephonic unit comprising a pair of assembly posts, channel members slideably mounted on said assembly posts, multiple pole pieces having both end portions thereof slideably mounted in said channel members with the pole faces of the pole pieces being opposed, a voice coil interlocked between said pole pieces, a vibratory armature extending through said voice coil, spacing means between the two pole faces and separating said pole faces a predetermined distance, and clamp means cooperating with said assembly posts to clamp said pole pieces against said spacing means.

6. A telephonic unit comprising a pair of parallel assembly posts, channel members slideably mounted on said assembly posts, a pair of laminated multiple pole pieces having both end portions thereof slideably mounted in said channel members with the pole faces of the pole pieces being opposed, a voice coil interlocked between said pole pieces, a vibratory armature extending through said voice coil and between certain of said pole faces, spacing means between the end pole faces and separating said pole faces a predetermined distance, and clamp means cooperating with said assembly posts to clamp said pole pieces against said spacing means.

7. In a telephonic unit, a base frame, a pair of removable assembly members mounted on said base frame, guiding means removable from and carried by said assembly members, a pair of pole pieces having both ends thereof slideably mounted within said guiding means, a voice coil mounted between and interlocked with said pole pieces, a vibrating armature extending between said pole pieces, spacing means between both ends of said pair of pole pieces, and means to clamp said pole pieces against said base frame.

8. A telephonic unit comprising a base frame, guiding members removable from and carried by said base frame, a pair of opposed pole pieces having both ends thereof slideably mounted between said guiding members at both ends thereof, spacing means between said pole pieces, means to clamp said pole pieces against said base frame, and a pair of permanent magnets with said pole pieces located intermediate said permanent magnets and in contact with the pole faces of said permanent magnets.

9. A telephonic unit comprising a base frame having a substantially plane top surface, a pole piece member having multiple pole faces and a longitudinal substantially flat edge opposite to said pole faces and in contact with the plane surface of said base frame, a second pole piece member having mutliple pole faces and being substantially identical with the first mentioned pole piece member and mounted above the same and with the pole faces thereon in opposition to the pole faces on the first mentioned pole piece member, spacing means between both ends of said pole piece members, a voice coil mounted between said pole piece members, a vibrating armature extending through said voice coil, at least one pair of said multiple pole faces being located outside of said vibrating armature so that the flux therebetween does not pass through said armature, permanent magnets mounted on opposite sides of said pole piece members, said permanent magnets being provided with openings enclosing said voice coil, clamping means to secure said pole piece members in fixed position on said base member and to apply pressure on said spacing means, and means to retain said permanent magnets in contact with said pole piece members.

10. A telephonic unit comprising a pair of pole piece members each having pole faces on the ends thereof and another pole face intermediate the ends thereof, the pole faces of one of said pole piece members being opposed to the pole faces of the other pole piece member, non-magnetic spacing means between the end pole faces, a voice coil between said pole piece members, an armature extending through said voice coil and having a fixed end and a free end, the free end only vibrating between the intermediate pole piece faces, one pair of said end pole faces comprising a shunt for magnetic forces through said pole pieces.

11. A telephonic unit comprising a pair of pole pieces, an armature extending between said pole pieces, a voice coil surrounding said armature, a permanent magnet connected with said pole pieces to energize the same whereby said armature is in the path of a portion of the flux produced by said permanent magnet, shunt portions on said pole pieces providing a leakage path for a small portion of the flux from said permanent magnet to establish a shunt path excluding the vibrating portion of said armature to receive a portion of the variable flux when said armature is vibrated by an alternating current which energizes said voice coil.

12. A telephonic unit comprising a pair of opposed pole piece members having end pole faces and an intermediate pole face, a permanent magnet connected with said pole piece members to energize the opposed pole faces to opposite magnetic polarities, non-magnetic spacing means intermediate the outer portions only of the outer pole faces to provide air gaps for the inner portions of the outer pole faces whereby Foucault currents are obviated in said non-magnetizable spacing members, the total area of the air gaps between the outer pole faces being equal to the area of the air gap between the intermediate pole faces.

13. A telephonic unit comprising a pair of opposed pole piece members having at least three opposed pole faces, an armature having a fixed end and a free end, the free end only vibrating between the middle pair of opposed pole faces, a permanent magnet connected to said pole piece members in such manner that the pairs of opposed end pole faces act as shunt paths for a portion of the flux of said permanent magnet.

GRENVILLE B. ELLIS.